United States Patent
Wrigley

[11] Patent Number: 5,876,169
[45] Date of Patent: Mar. 2, 1999

[54] THREADED ANCHOR

[75] Inventor: Andrew Nicholson Wrigley, Henderson, New Zealand

[73] Assignee: W. A. Deutsher Pty Ltd, Victoria, Australia

[21] Appl. No.: 63,395

[22] Filed: Apr. 21, 1998

[30] Foreign Application Priority Data

Apr. 21, 1997 [AU] Australia ................... PO6292

[51] Int. Cl.[6] ............................. F16B 21/00; F16B 13/04
[52] U.S. Cl. ............................... 411/344; 411/29; 411/345
[58] Field of Search .................... 411/29, 30, 31, 411/340, 344, 345, 346

[56] References Cited

U.S. PATENT DOCUMENTS

| 2,908,196 | 10/1959 | Apfelzweig . | |
|---|---|---|---|
| 3,127,807 | 4/1964 | Modrey . | |
| 5,322,401 | 6/1994 | Vernet et al. | 411/344 |
| 5,749,687 | 5/1998 | Kilgore, III | 411/340 X |

FOREIGN PATENT DOCUMENTS

| 400409 | 2/1967 | Australia | 411/344 |
|---|---|---|---|
| 0 468 679 | 1/1992 | European Pat. Off. . | |
| 2549868 | 5/1976 | Germany | 411/345 |
| 1152070 | 5/1969 | United Kingdom | 411/345 |

*Primary Examiner*—Neill Wilson
*Attorney, Agent, or Firm*—Lowe Hauptman Gopstein Gilman & Berner

[57] ABSTRACT

An anchor for fixing a first member (35) to a second member (8), such as a plasterboard or similar sheet material wall. The anchor is formed from a plastics material and includes an elongate shank (2) for passage through the second member (8) from a front surface (7) thereof to beyond the rear surface. The shank has a screw thread (17) for engaging the second member for retaining the shank therein, and the shank includes a passage (25) extending from an outer head end (3) for reception of a fastening screw (24-26), a toggle bar (5) and at least one frangible connector (20-21-22) attaching the toggle bar on the shank in an inoperative position at which the toggle bar extends in the longitudinal direction of the elongate shank and does not interfere with passage of the shank through the second member. The toggle bar includes a ramp surface (27) which is contactable by the fastening screw inserted through the passage (25) for moving the toggle bar from its inoperative position to an operative position at which it extends transversely to the longitudinal axis of the shank rearwardly of the rear surface of the second member. The toggle bar in its operative position includes a through hole (23) which is engageable by the fastening screw, whereby a first member (35) associated with the fastening screw is fixable to the second member (8) upon relative rotation of the fastening screw in the shank to draw the toggle bar into engagement with the rear surface of the second member.

14 Claims, 2 Drawing Sheets

THREADED ANCHOR

TECHNICAL FIELD

This invention relates to threaded anchors of the kind used to enable a member to be secured to a surface such as a wall surface. The invention is particularly concerned with such anchors for use in fastening systems in which a threaded fastener cooperates with the anchor for the purpose of securing one member to another. It will be convenient to hereinafter describe the invention with particular reference to fixing a member to a wall formed of plasterboard or another dry wall material, but the invention is to be understood as having wider application.

BACKGROUND

Anchors of the kind to which the present invention is directed are used in connection with plasterboard and other dry wall materials because of the relatively fragile nature of such materials. A standard fastening screw is unable to achieve a sufficiently firm grip in such material to enable the screw to support a load of any significance. It is therefore common practice to insert a threaded anchor into the plasterboard or other material and then drive a fastening screw into the anchor to achieve a load bearing fixture. An example of anchors of that kind is disclosed by Australian Patent 579622.

Conventional anchors of the foregoing kind are not entirely satisfactory if required to support a relatively heavy load, such as a load exceeding 5 kg for example.

DISCLOSURE OF THE INVENTION

It is an object of the present invention to provide an improved threaded anchor of the foregoing kind which can be manufactured at a relatively low cost and which is capable of supporting relatively heavy loads.

An anchor according to the present invention is characterised in that it is formed from a plastics material and includes a toggle bar which is attached to a shank of the anchor and is initially retained in an inoperative position at which the bar extends generally in the longitudinal direction of the shank and does not interfere with insertion of that shank into a wall or other member. The toggle bar is arranged to be responsive to contact by a fastening screw or other device inserted into the anchor so as to move out of the inoperative position to adopt an operative position at which the bar extends generally transverse to the longitudinal axis of the shank. When the toggle bar is in the operative position it is cooperable with both a fastening screw and the anchor shank such that it is drawn towards an outer or head end of the shank in response to relative rotation of the fastening screw.

Preferably a frangible connector releasably retains the toggle bar in the inoperative position prior to use of the anchor and more preferably more than one frangible connector is provided integral with both the anchor shank and the toggle bar. Such an arrangement may be achieved by forming the anchor shank and the toggle bar as a single piece by a moulding process or other suitable process. In one particular form of the invention the anchor is formed of a plastics material such as glass reinforced nylon, but other plastics materials could be used.

It is preferred that the anchor has a head and a drilling tip at respective opposite ends of the shank, and an external thread is preferably formed on the shank adjacent to the head. The toggle bar may be initially substantially contained within a cavity provided within the shank, and in a preferred form that cavity is an elongate slot which extends completely through the shank from one side to another and has its longitudinal axis substantially parallel to the longitudinal axis of the shank. In a preferred arrangement the slot is closed at each of its opposite ends, which are located adjacent the head and the drilling tip respectively of the anchor. In an alternative arrangement the slot may be open, or substantially open, at the end adjacent the drilling tip.

The drilling tip of the anchor may be of any suitable form arranged to create a hole of predetermined diameter within the member to which the anchor is to be attached. The diameter of the hole is preselected to suit the thread formed on the shank. In particular, the hole diameter needs to be less than the outside diameter of the thread. It is preferred that when the toggle bar is in the inoperative position no part of that bar extends radially outwards of the shank beyond the aforementioned diameter.

When the toggle bar is urged to adopt the operative position it is preferred that part of the bar projects radially outwards beyond each of two opposite sides of the shank. The radial projection of one of those parts may be substantially greater than that of the other. Alternatively, the toggle bar may project radially beyond one side only of the shank.

Retention means may be provided on the toggle bar and/or the shank to prevent the toggle bar separating completely from the shank during and after movement of the toggle bar into the operative position. It is also preferred that stop means functions to limit travel of the toggle bar away from the shank head when the toggle bar is moving towards or is located in the operative position.

It will be convenient to hereinafter describe the invention in greater detail by reference to a particular embodiment as shown in the accompanying drawings. The particularity of those drawings and the related description is not to be understood as superseding the generality of the preceding broad description of the invention.

DETAILED DESCRIPTION OF PREFERRED EMBODIMENT

Figure 1:
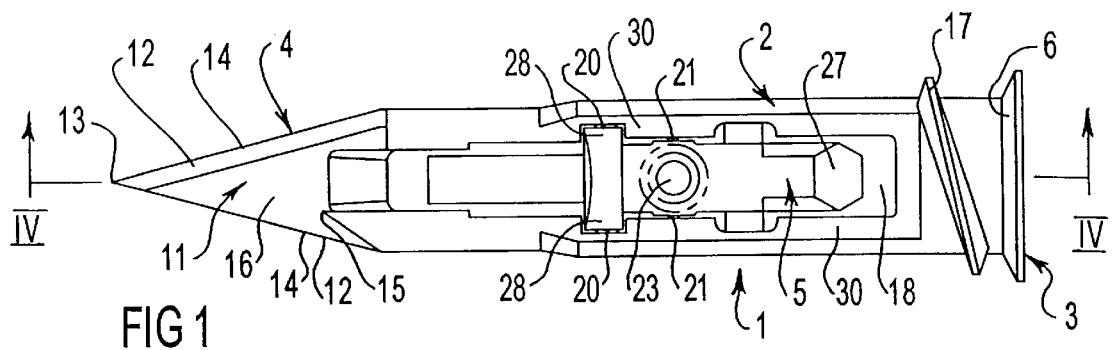
FIG. 1 is a side elevation view of an example embodiment of the invention.
Figure 2:
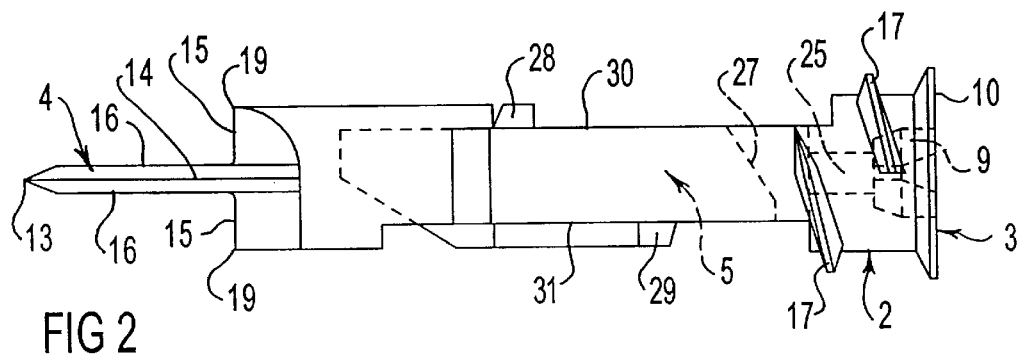
FIGS. 2 and 3 are further side elevation views with the anchor rotated through 90° and 180° respectively from the position shown by FIG. 1.

The anchor 1 as shown by FIGS. 1 to 4 includes a shank 2, a head 3 at one end of the shank 2, and a drilling tip 4 at the other end of the shank 2. A toggle bar 5, which also forms part of the anchor 1, is substantially contained within the body of the shank 2 as hereinafter described. The anchor 1 is formed of a suitable plastics material such as glass reinforced nylon which has been found to be satisfactory for the purposes of both strength and manufacturing convenience.

Figure 5:
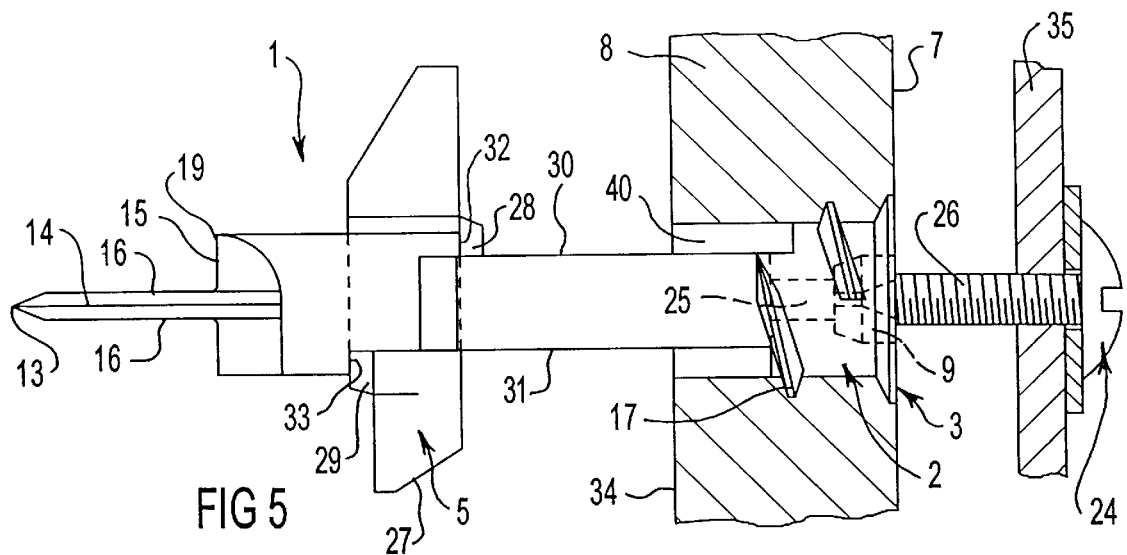
FIG. 5 shows the embodiment of FIG. 1 in use with the toggle bar in a first position.

The head 3 can be of any suitable form or size. In the example shown the head 3 is essentially a flange projecting radially of the shank 2 and has a sloping abutment face 6 which is adapted to engage against a surface 7 of a member 8 (which may be a wall) as shown by FIG. 5. A recess 9 (FIG. 2) for receiving a suitable driving tool is formed in an outer face 10 of the head 3.

Figure 3:
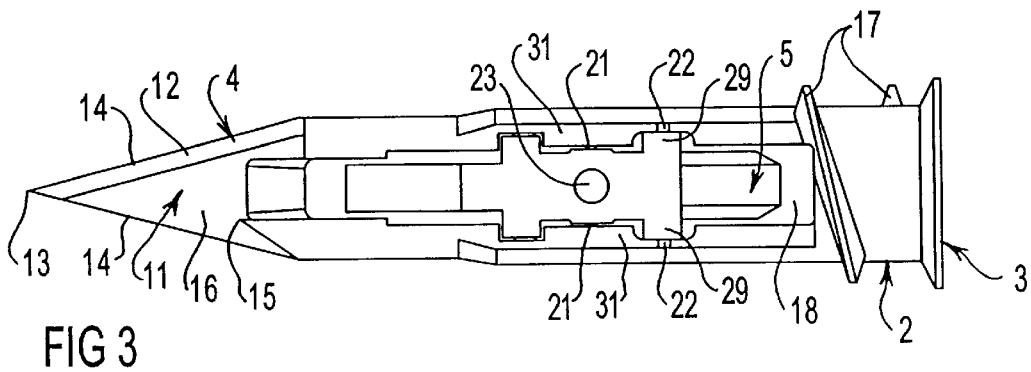

Any suitable drilling tip could be adopted having regard to factors such as the intended circumstances of use of the anchor 1. The example drilling tip 4 shown in the accompanying drawings has a form which is suitable for use with plasterboard. The tip 4 includes a substantially flat blade 11, the narrow surface sides 12 of which converge to a pointed tip 13. The surface of each side 12 may slope inwards from a respective cutting edge 14 to enhance the drilling performance of the blade 11. Another cutting edge 15 is formed at the inner end of the blade 11 on each side, and each of those edges 15 extends radially outwards from a respective broad surface side 16 of the blade 11. It is preferred, as shown by FIGS. 1 and 3, that the two cutting edges 15 are spaced apart in a direction transverse of the shank 2, and each is located on a respective one of two opposite sides of the shank axis.

A thread 17 is formed on the shank 2 adjacent the head 3. The size and form of the thread 17 is selected to ensure an effective and secure grip within the material with which the anchor 1 is to be used. It is preferred that the drilling tip 4 is arranged to form a hole 40 (FIG. 5) having a diameter no greater than, or not substantially greater than, the root diameter of the thread 17. As will be apparent from FIG. 5, the thread 17 is intended to have a self-tapping function in that it intrudes into the member 8 by displacing material of which that member is formed. The anchor 1 is thereby firmly attached to the member 8. In particular, the attachment is such that the pull-out resistance of the anchor 1 is substantial.

The toggle bar 5 may be mounted on the shank 2 in any suitable manner, but it is preferred to initially form the anchor 1 so that the bar 5 is located within a cavity in a side of the shank 2. Such location is intended to provide an inoperative position for the bar 5 at which it does not impede the operation of the drilling tip 4 or the passage of the shank 2 through the hole 40 formed by the drilling tip 4. In the particular arrangement shown, the cavity is in the form of an elongate slot 18 which passes transversely through the shank 2 from one side to another and extends generally in the longitudinal direction of the shank 2. That is, the slot 18 is open at each of two opposite sides of the shank 2. It is preferred however, that the slot 18 is closed, at least to some extent, at each of its opposite ends which are adjacent the head 3 and the drilling tip 4 respectively.

Figure 4:
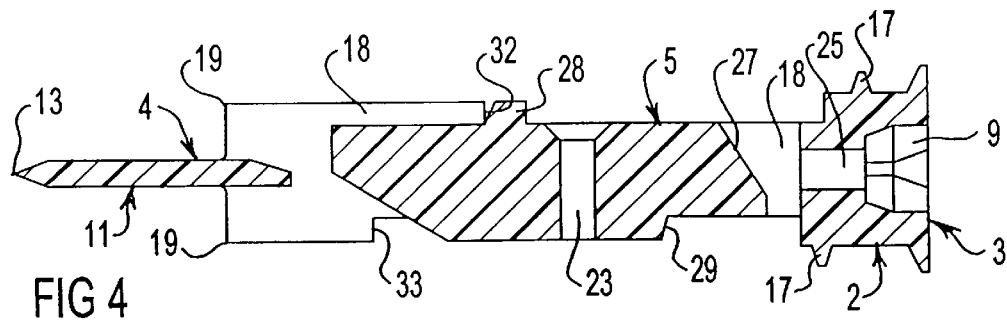
FIG. 4 is a cross sectional view taken along line IV—IV of FIG. 1.

As best seen in FIG. 4, when the toggle bar 5 is in the inoperative position it is preferred that no part of the bar 5 projects radially outwards of the shank 2 beyond the outer end 19 of the cutting edges 15. In the arrangement shown, each cutting edge 15 extends the same distance radially outwards of the shank axis. In other arrangements one edge 15 may have a greater radial extent than the other, and in that case it is preferred that no part of the toggle bar (when inoperative) extends radially outwards further than the edge 15 having the greatest radial extent.

The means adopted to releasably retain the toggle bar 5 in the inoperative position includes a frangible connection between the bar 5 and the shank 2 at each of the zones marked 20, 21 and 22 in FIGS. 1 and 3. With reference to FIG. 1, frangible connections 20 are at the "top" of the toggle bar 5, and frangible connections 22 are at the "bottom" (these positions are reversed in the FIG. 3 orientation). Frangible connections 21 are between the top and bottom of toggle bar 5 in both FIG. 1 and FIG. 3, and between connections 20 and 22. Frangible connections could be provided at other locations, and the number of connections could be greater than or less than the number shown in the attached drawings.

The toggle bar 5 is preferably an elongate member as shown, and a hole 23 extends transversely through the bar 5 as best seen in FIG. 4. The hole 23 is arranged to receive and cooperate with a fastening screw 24 (FIGS. 5 and 6) as hereinafter described.

When the toggle bar 5 is moved relative to the shank 2 so as to adopt its operative position, part of the bar 5 projects radially beyond at least one side of the shank 2. In the particular arrangement shown by the drawings, respective parts of the bar 5 project beyond each of two opposite sides of the shank 2, but that is not essential.

The anchor 1 can be driven into a wall or other member 8 in a known manner until its head 3 contacts surface 7 of member 8 as in FIG. 5. After the anchor 1 has been so positioned, a fastening screw 24 (or other device) can be inserted into an open ended passage 25 (FIG. 4) which extends between the slot 18 and the end face 10 of the anchor 1. It is preferred that the passage 25 has a diameter such as to freely receive the threaded shank 26 of the fastening screw 24. When the screw 24 is first introduced into the anchor 1 through the passage 25, the terminal end of the screw shank 26 strikes against a ramp surface 27 of the toggle bar 5. Endwise pressure applied to the screw 24 then tends to push the adjacent end of the toggle bar 5 radially outwards of the shank 2, and the forces thereby generated cause fracture of the connections 20, 21 and 22. Generally, frangible connections 22 fracture first, then connections 21 and finally connections 20. As a result, the toggle bar 5 is caused to swing through 90° to adopt the operative position as shown by FIG. 5.

The toggle bar 5 may be closer to the head 3 than is shown by FIG. 5 when it first arrives at the operative position. Continued endwise pressure on the screw 24 however, causes the toggle bar 5 to be pushed axially of the shank 2 in a direction away from the head 3. It is preferred that stop means functions to prevent movement of the toggle bar 5 beyond the position shown by FIG. 5. It is also preferred that retention means operates to prevent the toggle bar 5 falling through the slot 18 and thereby becoming separated from the shank 2.

In the particular arrangement shown, the aforementioned retention means also functions as centralising means in that it serves to retain the toggle bar 5 in a position at which the through hole 23 is substantially aligned with the shank 26 of fastening screw 24. In other arrangements the centralising means might be formed separate of the retention means. Any suitable retention means could be adopted, but in the example shown that means includes two pair of lugs 28 and 29 respectively (note that the frangible connections 20 are formed between lugs 28 and the shank 2 and the frangible connections 22 are formed between lugs 29 and shank 2). Each of the lugs 28 and 29 extends laterally from the main body of the bar 5 by a distance such that it overlies and is engageable with a surface 30 or 31 respectively of the shank 2 when the bar 5 is in the operative position. Such engagement prevents the bar 5 passing completely through the slot 18. The space between the lugs 28 and 29 is preferably not substantially greater than the spacing between the surfaces 30 and 31, and that permits the lugs 28 and 29 to also function as centralising means. In movement of the toggle bar 5 from its inoperative to its operative position, the lugs 28 provide a pivot point on surface 30 until lugs 29 contact surface 31.

The stop means previously referred to could be formed in many ways. In the arrangement shown, the stop means includes two pair of shoulders 32 and 33 respectively formed on the shank 2. Each of the shoulders 32 is at one end of a respective one of the surfaces 30, and each of the shoulders 33 is at an end of a respective one of the surfaces 31. As best seen in FIG. 5, when the toggle bar 5 is in the operative position each one of the lugs 28 is engageable with a respective shoulder 32 and each one of the lugs 29 is engageable with a respective one of the shoulders 33.

Figure 6:
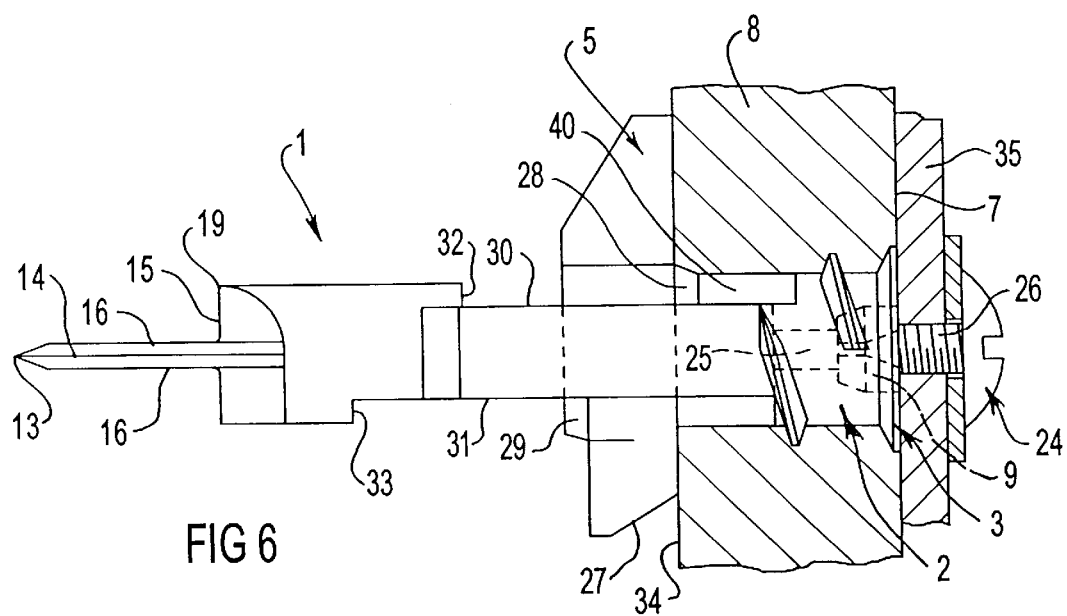
FIG. 6 is similar view to FIG. 5 but showing the toggle bar in a second (clamping) position.

When the toggle bar 5 is in the position shown by FIG. 5, the screw shank 26 is substantially aligned with the toggle bar through hole 23. Endwise pressure on the screw 24 forces the shank 26 into the hole 23, and simultaneous rotation of the screw 24 causes the shank 26 to cut or form a thread in the hole 23. The bar 5 is held against rotation with the screw 24 because of its confinement within the slot 18. The self-tapping function of the screw 24 then causes the bar 5 to be drawn towards the head 3, and a position as shown by FIG. 6 is eventually reached. At that position the bar 5 is firmly drawn against the surface 34 of the member 8, and another (eg. a first) member 35 is clamped against the surface 7 of the (eg. second) member 8.

It will be apparent from the foregoing description that the present invention provides a relatively simple yet effective anchor for fastening screws. The anchor is relatively inexpensive to manufacture and is simple to use.

Finally, it is to be understood that various alterations, modifications and/or additions may be introduced into the constructions and arrangements of parts previously described without departing from the ambit of the invention as defined in the following claims.

I claim:

1. An anchor for fixing a first member to a second member, wherein the second member is a plasterboard or similar sheet material having a front surface and a rear surface, wherein the anchor is formed from a plastics material and includes a head and an elongate shank for passage through the second member from the front to beyond the rear surface, a screw thread on the shank adjacent the head for engaging the second member for retaining the shank therein, a drilling tip formed at an end of the shank opposite the head, wherein the shank includes a passage in the longitudinal direction of the shank extending longitudinally from an outer end thereof for reception of a fastening screw, a toggle bar and at least one frangible connector attaching the toggle bar on the shank in an inoperative position at which the toggle bar extends in the longitudinal direction of the elongate shank and does not interfere with passage of the shank through the second member, wherein the toggle bar is contactable by a fastening screw inserted through the passage in the shank for movement thereby from its inoperative position to an operative position to an operative position at which the toggle bar extends transversely to the longitudinal axis of the shank rearwardly of the rear surface of the second member, and wherein the toggle bar in its operative position is engageable by the fastening screw for movement thereby towards the rear surface of the second member, whereby a first member associated with the fastening screw is fixable to the second member upon relative rotation of the fastening screw in the shank to draw the toggle bar into engagement with the rear surface of the second member.

2. An anchor as claimed in claim 1 wherein the at least one frangible connector is breakable upon movement of the toggle bar by the fastening screw from its inoperative position to its operative position.

3. An anchor as claimed in claim 2 wherein the elongate shank includes a cavity and the toggle bar is retained in the cavity in its inoperative position.

4. An anchor as claimed in claim 3 wherein the cavity is an elongate slot which extends through the shank from one to another side thereof.

5. An anchor as claimed in claim 1 wherein the toggle bar includes a ramp surface which the fastening screw contacts for initiating movement of the toggle bar from its inoperative position to its operative position.

6. An anchor as claimed in claim 1 wherein the toggle bar includes a transverse through hole within which the fastening screw is engageable when the toggle is in its operative position for movement of the toggle bar, upon relative rotation of the fastening screw in the through hole, towards the rear surface of the second member.

7. An anchor as claimed in claim 6 wherein the plastics material from which the toggle bar is formed and the through hole are such that the fastening screw forms a screw thread in the through hole.

8. An anchor as claimed in claim 3 wherein the elongate shank and the toggle bar include cooperative retention means for preventing the toggle bar from completely separating from the shank during and after its movement into the operative position.

9. An anchor as claimed in claim 8 wherein the cooperative retention means comprises lateral extensions on the toggle bar for retaining the toggle bar within the cavity.

10. An anchor as claimed in claim 9 wherein the lateral extensions are arranged to locate the toggle bar in its operative position within the cavity such that a transverse through hole in the toggle bar within which the fastening screw is engageable is aligned for reception of the fastening screw.

11. An anchor as claimed in claim 10 wherein the cavity includes abutments with which the lateral extensions are engageable to limit movement of the toggle bar in its operative position along the cavity, whereby the fastening screw is engageable in the through hole to form a screw thread therein for moving the toggle bar towards the rear surface of the second member.

12. An anchor as claimed in claim 1 wherein the toggle bar in its operative position projects laterally of the shank on opposite sides thereof.

13. An anchor as claimed in claim 1 wherein the anchor is integrally moulded from a plastics material.

14. An anchor for fixing a first member to a second member, wherein the second member is a plasterboard or similar sheet material having a front surface and a rear surface, wherein the anchor includes an elongate shank formed with a drilling tip to facilitate passage through the second member from the front to beyond the rear surface, wherein the shank includes a passage in the longitudinal direction of the shank extending longitudinally from an outer end thereof for reception of a fastening screw, a toggle bar and at least one frangible connector attaching the toggle bar on the shank in an inoperative position at which the toggle bar extends in the longitudinal direction of the elongate shank and does not interfere with passage of the shank through the second member, wherein the toggle bar is contactable by a fastening screw inserted through the passage in the shank for movement thereby from its inoperative position to an operative position at which the toggle bar extends transversely to the longitudinal axis of the shank rearwardly of the rear surface of the second member, and wherein the toggle bar in its operative position is engageable by the fastening screw for movement thereby towards the rear surface of the second member, whereby a first member associated with the fastening screw is fixable to the second member upon relative rotation of the fastening screw in the shank to draw the toggle bar into engagement with the rear surface of the second member.

* * * * *